United States Patent [19]

Hayday et al.

[11] Patent Number: 5,888,250
[45] Date of Patent: Mar. 30, 1999

[54] BIODEGRADABLE DRY CLEANING SOLVENT

[75] Inventors: William A. Hayday, Woodbury; Stephen P. Bates, Huntington, both of N.Y.

[73] Assignee: Rynex Holdings Ltd., Hamilton, Belgium

[21] Appl. No.: 833,341

[22] Filed: Apr. 4, 1997

[51] Int. Cl.⁶ .................................. D06L 1/02; D06L 1/04
[52] U.S. Cl. .......................... 8/142; 8/137; 8/139; 134/42; 134/2; 134/40; 510/175; 510/176; 510/177; 510/245; 510/285; 510/291; 510/292; 510/408; 510/411; 510/415
[58] Field of Search .................................. 8/137, 142, 139; 134/42, 2, 40; 510/175, 176, 177, 245, 285, 291, 292, 408, 411, 415; 203/55

[56] References Cited

U.S. PATENT DOCUMENTS 5,238,987  8/1993  Bodwell et al. ......................... 524/376
5,348,679  9/1994  Weinhold et al. ....................... 510/370

FOREIGN PATENT DOCUMENTS 0479146   4/1992   European Pat. Off. .
8003592   6/1994   Japan .
2230791  10/1990   United Kingdom .
96/28535  9/1996   WIPO .

OTHER PUBLICATIONS

Hall, The Standard Handbood of Textiles, pp. 207–214 and 252–252. (Month Unkonwn).

*Primary Examiner*—Alan Diamond
*Attorney, Agent, or Firm*—Synnestvedt & Lechner

[57] ABSTRACT

A method for dry-cleaning garments which comprises treating them with an azeotropic solvent of propylene glycol tertiary-butyl ether and water.

10 Claims, No Drawings

BIODEGRADABLE DRY CLEANING SOLVENT

BACKGROUND OF THE INVENTION

FIELD OF THE INVENTION

The present invention relates to a novel dry-cleaning solvent and a method for effecting dry-cleaning using said solvent. More particularly, the present invention relates to a solvent which is comparable or superior to perchloroethylene in its attributes and benefits, but which does not suffer from the serious environmental, health and occupational negatives and problems associated with the use of perchloroethylene.

DESCRIPTION OF THE PRIOR ART

The most widely used dry-cleaning solvent is perchloroethylene, which is commonly referred to and will be referred to sometimes hereinafter as ("Perc"), which is a chlorinated hydrocarbon-based solvent. It is the dry-cleaning solvent of choice throughout North America, Europe and Asia.

In addition to Perc's use in the dry-cleaning industry, it has found extensive use as a degreasing agent in the metals industry, in scouring/milling and in various "clean room" applications in the semiconductor and electronics industry. The industrial uses of Perc are approximately tenfold greater than its use as a solvent for dry-cleaning.

While Perc has been found to be an effective dry-cleaning agent due to the fact that it does not damage synthetic fabrics or cause shrinkage to fabrics containing naturally occurring fibers, such as wool, as well as being non-flammable and possessed of a relatively low boiling point, which permits its being reclaimed and purified by means of ordinary distillation, it does present a number of other problems which present drawbacks to its use.

In particular, perchloroethylene presents a number of health and environmental hazards which would militate against its continued use, provided a substitute solvent of comparable quality were available which were free of the aforementioned hazards.

Since Perc is heavier than water, its disposal represents a significant environmental risk since it will sink to the bottom of the aquifer, lake, river, etc., with possibly resultant contamination of the water supply. Additionally, Perc vapors have been implicated as having a deterious effect on the central nervous system. In addition, due to its being a highly chlorinated molecule, Perc has been identified as being a significant health hazard to cattle, and as a cause of skin cancer, particularly melanoma, due to the action of the chlorine in Perc depleting oxygen from the ozone layer. Furthermore, and of particular import, is the fact that Perc is not biodegradable and, hence, will, over a period of time accumulate, presenting a significant industrial waste disposal hazard.

As the nature and seriousness of the foregoing problems became more and more manifest with the passage of time and with the completion of various research and clinical investigations into the nature of Perc and its mechanisms of action, the use of alternative solvents has been sought, but none have met with any degree of commercial success since they could not match the results obtained by Perc as a dry-cleaning agent.

However, at this point in time, when environmental concerns are being rigorously monitored and policed by domestic and foreign governments by means of legislation and civil and even criminal prosecution, the need for a substitute solvent for Perc for dry-cleaning operations, as well as other operations, has become a matter of some degree of urgency.

A difficulty in identifying a replacement dry-cleaning solvent for Perc is that it must meet so many requirements, both as to its efficacy as a dry-cleaning agent, i.e., non-shrinking with respect to about 160 types of fabric, dye-fast or non-bleeding with respect to about 900 types of dyes, a high flashpoint to render it non-flammable and non-combustible, the ability to separate from water, effective detergency, distillable, reclaimable, usable with existing dry-cleaning equipment, etc., as well as its being non-polluting to the water supply and the ozone layer, biodegradable, non-toxic, non-carcinogenic, etc.

One proposed solvent substitute, namely, propylene glycol monomethyl ether, which is disclosed in EP 0479 146 A2 as possessing many desirable properties, was found to be wanting in that it causes damage to weaker dyes and to fine yarns and to delicate fabrics, such as acetates, due to its pronounced tendency to accumulate water. Water accumulation or water-miscibility is also a decided negative from another aspect in that it significantly impairs the efficiency of the dry-cleaning process since the dry-cleaning equipment is burdened with the handling of excessive quantities of water and the solvent stock is diluted and must be brought back to a correct ratio for stability reasons.

In line with the foregoing, it is an object of the present invention to provide a solvent which possess comparable, if not superior chemical and physical properties when compared to Perc in dry-cleaning, degreasing of metals, cleaning of electronic components and the scouring and milling of woolens, while, simultaneously, protecting the environment, public health and safety from the many known negatives associated with the use of Perc.

It is a further object of the present invention to provide a dry-cleaning solvent which has a specific gravity less than that of water.

It is still a further object of the present invention to provide a dry-cleaning solvent which minimizes or eliminates shrinkage of woolen garments, prevents or limits the bleeding of dyes, and which is able to treat acetates, silks, virgin wool and other delicate fabrics gently so as to avoid damage.

It is still yet another object of the present invention to provide a dry-cleaning and degreasing solvent which is non-flammable and which has a sufficiently low boiling point to allow it to be reclaimed and purified via conventional distillation processes.

The foregoing objects and other objects and advantages of the present invention will be apparent to persons of ordinary skill in the art from the following description of the specific embodiments of the invention.

SUMMARY OF THE INVENTION

As a result of experimental investigation, it has been found that a particular propylene glycol ether, when mixed with certain weight percentages of water to form an azeotropic mixture, serves to provide a highly effective dry-cleaning solvent which performs as well as, or better than, Perc, and without its attendant environmental, health and occupational safety problems. An azeotropic mixture of water and the particular propylene glycol ether which has been identified has the advantage of behaving like a single substance. A mixture of chemicals is azeotropic if the vapor composition is identical to that of the liquid phase. This means that the distillate of an azeotrope is theoretically identical to the solvent from which it is distilled.

DETAILED DESCRIPTION OF THE INVENTION

It has been found that when propylene glycol tertiary-butyl ether (PTB) is used in the dry-cleaning of garments, it possesses all of the attributes associated with perchloroethylene and none of its drawbacks. Furthermore, propylene glycol tertiary butyl ether also has certain significant advantages not possessed by perchloroethylene. For instance, by using an azeotropic mixture of PTB and water, the water component of the binary azeotrope is effectively tied-up, thus avoiding the tendency of woolen garments to shrink in water, while simultaneously preventing damage to acetates. Further, the water component lowers the boiling point of PTB to 96° C. and raises its flashpoint.

It has been found, for example, that when propylene glycol tertiary-butyl ether is mixed with water in certain weight percentages, an azeotrope is formed which is preferred in the dry-cleaning of garments.

It has also been determined that a solvent comprising a mixture of PTB and water is effective in degreasing of metals, in the cleaning of electronic components, as well as being effective in the scouring and milling of raw wool. An azeotropic ratio of PTB and water is not needed in these types of processes, but is nonetheless preferred. This is especially so in the scouring of raw wool, which involves the pulling of oils and fatty acids, e.g. lanolin, from wool and in the milling of the yarns formed therefrom. Such scouring and milling operations are conducted in dry-cleaning machinery.

A particular advantage of the PTB-water azeotrope of the present invention in dry-cleaning is that it does not behave like a typical mixture, but, rather, its behavior is the same as a single substance. This permits a better defined separation upon distillation at a lower boiling point and also facilitates its being reclaimed, more effectively, at a level of 99% or greater, and also enhances its purification using conventional distillation techniques.

Of particular note, from an economic as well as an operational standpoint, is the ability of PTB to separate from water. This is of particular significance in dry-cleaning since garments entering a dry-cleaning plant contain water in the form of moisture. If water were not separable from the PTB solvent, the PTB azeotrope would be diluted with free water and, thus, the dry-cleaning process, and its efficiency, would be seriously compromised, as would the reclaimability of PTB. For example, from the perspective of performance, the PTB will enhance the ability to dry and clean woolen and cotton garments since those types of garments will be subjected to little, if any, shrinkage due to the fact that PTB has a limited degree of miscibility with water. Additionally, this limited degree of miscibility avoids dilution of the solvent stock with its attendant problems, which are not inconsiderable when one considers the need to replenish the solvent.

The PTB azeotrope is a very effective dry-cleaning solvent since its detergency action breaks down solvent-soluble stains, which account for 15% of all stains found in garments and which are caused by fatty acids. The detergency of the solvent occurs by lifting the soiled area from a surface and by displacing it with surface active materials that have a greater affinity for the surface than they do for the soiled area. It can also deal most effectively with water-soluble stains, which account for more than 80% of stains encountered in dry-cleaning, such as, for example stains from fruit, blood, urine, sweat, etc. It has also been found to limit the bleeding of dyes and to avoid the shrinkage of man-made polymers, such as acetates.

From the standpoint of health and safety, which as previously mentioned are of significant importance in the present era, the PTB azeotrope is non-flammable, non-combustible, non-carcinogenic, non-toxic and, of the utmost import, it is biodegradable and weighs less than water, i.e., its specific gravity is less than that of water.

The PTB azeotrope dries at a relatively low temperature, namely, about 55° C., which is well within the drying requirements for fabrics constructed of fine yarns so as to avoid damage thereto by excessive heat.

In preparing the PTB azeotropic solvent of the present invention, PTB and water, are combined, most preferably at the azeotropic ratio.

The mixture is first heated until it boils at its azeotropic boiling point, which in the case of PTB and water, is about 96° C. The heated mixture should then be cooled to molecularly bind the water to the fullest extent. This results in the formation of the PTB-water azeotrope. The resultant azeotrope can now be distilled, with the azeotrope recoverable after distillation. The number of distillations which can be done are indefinite in number, with a recovery rate of the PTB being in excess of 99%.

A departure from the azeotropic ratio of about 82%, by weight, of PTB and about 18%, by weight, of water will result in the shrinkage of woolen garments if the amount of PTB is decreased, due to the presence of a greater quantity of unbound water in the composition or, conversely, if the quantity of PTB is increased, damage to acetate fabrics can occur, accompanied by increased bleeding of dyes. It is therefore preferable that the quantity of PTB be maintained at less than 90%, by weight, and even more preferably less than 85%, by weight. At those percentages, it is still an effective dry-cleaning solvent. Most preferably, as stated previously, is the use of about 82%, by weight, of PTB and about 18%, by weight, of water which is the azeotropic ratio and which provides the best dry-cleaning results combined with the most efficient and cost-effective dry-cleaning operation.

While PTB can quite successfully and efficiently clean garments made of all types of textile fabrics without the need for additional agents, such as detergents and fabric softeners, it is desirable to include in the formulation one or more surfactants to enhance the detergency action of the PTB, by means of reducing the surface tension of the azeotrope. Exemplary surfactants are fatty alcohol polyethylene glycol ethers and linear primary alcohol eynoxylates. While fabric softeners are not necessary to achieve effective dry-cleaning, they are beneficial and serve to enhance the dry-cleaning process.

The following examples are set forth to illustrate more clearly the principle and practice of the present invention. It is to be understood, of course, that the invention is not limited to the specific examples.

EXAMPLE 1

One of the most significant properties that a dry-cleaning solvent should possess is limited fiber shrinkage to ensure that fibers comprising the garment do not shrink excessively. Excessive shrinkage, naturally, deforms the garment rendering it unsuitable for future wear. Accordingly, the dry-cleaning solvent which is employed must not excessively shrink the component fibers which comprise the fabric of the garment. In contemporary usage, garments containing virgin wool and acetates, such as the lining found in men's jackets, can ill-afford shrinkage beyond established norms.

A shrinkage test was conducted with respect to virgin wool by taking a series 4"×4" patterned virgin wool swatches and immersing them in separate containers containing each of the azeotropic solvents set forth in Table I below. Approximately 10 minutes of mechanical action was applied to ensure that the wool fibers became totally saturated. The test swatch was then removed and dried at a constant temperature not exceeding 55° C. The test swatch was then compared with a control material to identify any changes in the fibers to ensure that the patterns had not changed their dimensions.

Each of the test solvents was then analyzed to identify any fiber loss. The maximum shrinkage should not exceed 2% on the first immersion test and is usually expected to be less than 0.25% in any subsequent immersion test.

TABLE I

| Solvent | % Shrinkage on 1st Immersion |
| --- | --- |
| PM (propylene glycol methyl ether) | 2% |
| PNP (propylene glycol n-propylether) | 2% |
| DPM (dipropylene glycol methyl ether) | 2% |
| PERC (perchloroethylene) | 2% |
| PTB (propylene glycol tertiary-butyl ether) | ½% |

EXAMPLE 2

The shrinkage test conducted in Example 1, was repeated with 4"×4" swatches of acetate fabric. The results are set forth below in Table II.

TABLE II

| Solvent | % Shrinkage on 1st Immersion |
| --- | --- |
| PM (propylene glycol methyl ether) | 3% |
| PNP (propylene glycol n-propyl ether) | 3% |
| DPM (dipropylene glycol methyl ether) | 2–5% |
| PERC (Perchloroethylene) | 2% |
| PTB (propylene glycol tertiary-butyl ether) | ½% |

It is evident from an examination of the results tabulated in Tables I and II that propylene glycol tertiary-butyl ether azeotropic mixture resulted in the smallest percentage of shrinkage in both virgin wool and acetate fabrics and, in fact, reduced shrinkage by about 400% or greater compared with the other solvents, including Perc, when employed with virgin wool, and an even greater percentage when employed with acetate fabrics.

EXAMPLE 3

The bleeding of dyestuffs is the bane of the dry-cleaners existence. The variety of dyestuffs, their differing chemical structures, the degree to which they are soluble or insoluble in the particular dry-cleaning solvent employed, etc., present manifold problems which must be met, addressed and solved before a new dry-cleaning solvent can be introduced successfully.

Dye-bleeding tests were conducted by taking test swatches of virgin wool, 1"×1", and immersing them in separate containers filled with each of the azeotropic solvent mixtures indicated in Table III below. Ball bearings were added to each of the containers to increase the impact of mechanical action on the dyes in an effort to dislodge the dyes from the fabric. The increased mechanical action was applied for a period of 10 minutes. Thereafter, the test swatch and the ball bearings were removed from the solvent. Colorimeter tests employing a Bausch Lomb Spec-20 colorimeter were conducted on the solvent remaining, which serves to indicate the relative quantity of dye removed by the test swatch. The results are set forth below in Table III with respect to the various solvents tested on virgin wool swatches which had been dyed red, green, yellow, blue and purple, respectively. The greater the value, the greater the degree of dye-bleeding.

TABLE III

| | Dye Bleeding | | | | |
| --- | --- | --- | --- | --- | --- |
| Solvent | Red | Green | Yellow | Blue | Purple |
| PM | 8 | 7 | 7 | 8 | 8 |
| PNP | 6 | 4 | 4 | 5 | 6 |
| DPM | 6 | 3 | 5 | 5 | 6 |
| Perc | 2 | 2 | 1 | 1 | 3 |
| PTB | 2 | 1 | 1 | 2 | 1 |

EXAMPLE 4

In similar fashion to Example 3 above, swatches of various colored acetate fabrics were tested to determine dye bleeding in the below-listed solvents. The results are set forth in Table IV below.

TABLE IV

| | Dye Bleeding | | | | |
| --- | --- | --- | --- | --- | --- |
| Solvent | Red | Green | Yellow | Blue | Purple |
| PM | 9 | 8 | 9 | 9 | 8 |
| PNP | 9 | 8 | 8 | 8 | 8 |
| DPM | 8 | 8 | 8 | 9 | 8 |
| Perc | 1 | 1 | 1 | 2 | 2 |
| PTB | 2 | 1 | 1 | 2 | 2 |

It is clearly evident from Tables III and IV that the azeotropic solvent of the present invention, namely, propylene glycol tertiary-butyl ether (PTB), is far superior to PM, PNP and DPM, and is comparable to Perc, as respects dye bleeding, whether the fabric employed is virgin wool or acetate. In point of fact, the solvent of the present invention was in each instance, regardless of fabric type or dye color, significantly more effective in preventing the bleeding of dyes when compared with the non-Perc solvents.

EXAMPLE 5

A stain removal test was conducted with respect to cotton by taking a series of 12"×12" test panels of cotton and applying thereto standard stain items as set forth below in Table V, which were then cleaned with a Perc azeotropic mixture containing soap. Another set of test panels similarly stained were cleaned with the PTB azeotropic mixture of the present invention without soap. It will be understood by those skilled in the art that the purpose of the solvent is to act as a carrier for detergents, soaps, water, etc. and that most stains are removed by "spotting" prior to the dry-cleaning process.

TABLE V

| Type of Stain | Perc w/ Soap | PTB w/o soap |
|---|---|---|
| Shoe polish | 50% | 50% |
| Lipstick | 60% | 70% |
| Face Powder | 100% | 100% |
| Ketchup | 40% | 70% |
| Salad Dressing | 70% | 80% |
| Animal Fat | 80% | 80% |
| Mascara | 90% | 90% |
| Mayonnaise | 90% | 90% |
| Coffee | 30% | 60% |
| Ink | 30% | 40% |
| Motor Oil | 80% | 80% |
| Syrup | 80% | 90% |

It is evident with respect to each of the stains enumerated, which are quite typically encountered by dry-cleaners, that the PTB azeotropic mixture of the present invention performed as well as or better than Perc, which is the most prevalent solvent employed in dry-cleaning today.

The foregoing examples are intended to be illustrative only and are not to be deemed as in any way limiting the scope of the appended claims.

What is claimed is:

1. A composition for dry-cleaning garments comprising from about 82%, by weight, to about 90% by weight of propylene glycol tertiary-butyl ether, a fabric softener and water.

2. The composition in accordance with claim 1 wherein the propylene glycol tertiary-butyl ether comprises about 90%, by weight, and the water comprises from about 10%, by weight, of the composition.

3. The composition in accordance with claim 1 wherein the propylene glycol tertiary-butyl ether comprises about 82%, by weight, and water comprises about 18%, by weight, of the composition.

4. A method of dry-cleaning garments, which comprises treating the garments in a composition comprising propylene glycol tertiary-butyl ether and water for a period of time sufficient to effect dry-cleaning.

5. The method in accordance with claim 4 wherein the period of time is sufficient to remove solvent-soluble and water-soluble stains.

6. The method in accordance with claim 4, wherein said propylene glycol tertiary-butyl ether comprises about 90%, by weight, of the composition and water comprises about 10%, by weight, of the composition.

7. The method in accordance with claim 4 wherein the propylene glycol tertiary-butyl ether comprises about 82%, by weight, of the composition and water comprises about 18%, by weight.

8. A method of cleaning scoured and milled wool, which comprises treating the scoured and milled wool with a composition comprised of from about 82%, by weight, to about 90%, by weight, of propylene glycol tertiary-butyl ether and water to affect cleaning.

9. The method in accordance with claim 8 wherein the propylene glycol tertiary-butyl ether comprises about 90%, by weight, and water comprises about 10%, by weight, of the composition.

10. The method in accordance with claim 8 wherein the propylene glycol tertiary-butyl ether comprises about 82%, by weight, and the water comprises about 18%, by weight, of the composition.

* * * * *

UNITED STATES PATENT AND TRADEMARK OFFICE
CERTIFICATE OF CORRECTION

PATENT NO. : 5,888,250
DATED : March 30, 1999
INVENTOR(S) : Hayday et al.

It is certified that error appears in the above-identified patent and that said Letters Patent is hereby corrected as shown below:

On the title page, item [73],
under Assignee, "Belgium" should be - - Bermuda - - .

Signed and Sealed this

Twenty-eighth Day of September, 1999

*Attest:*

Q. TODD DICKINSON

*Attesting Officer*   *Acting Commissioner of Patents and Trademarks*